Dec. 20, 1949     R. E. DUPLESSIS     2,491,608
POWER-OPERATED GUN TURRET AND
CONTROL MECHANISM THEREFOR
Filed April 13, 1945     15 Sheets-Sheet 1
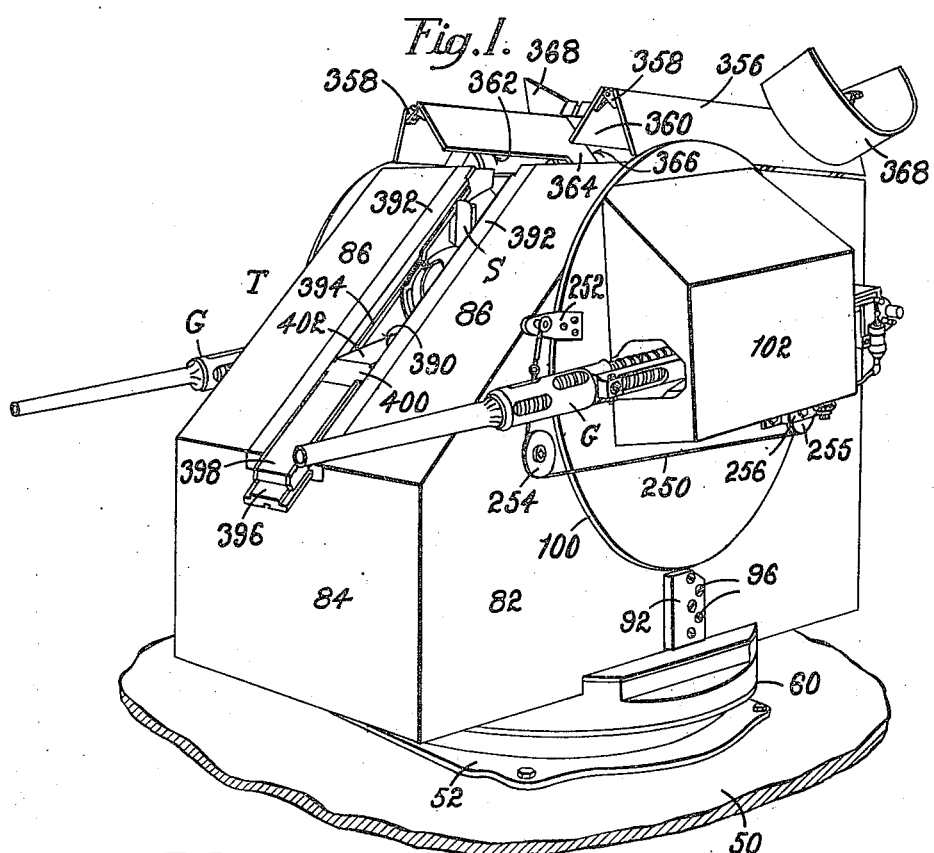
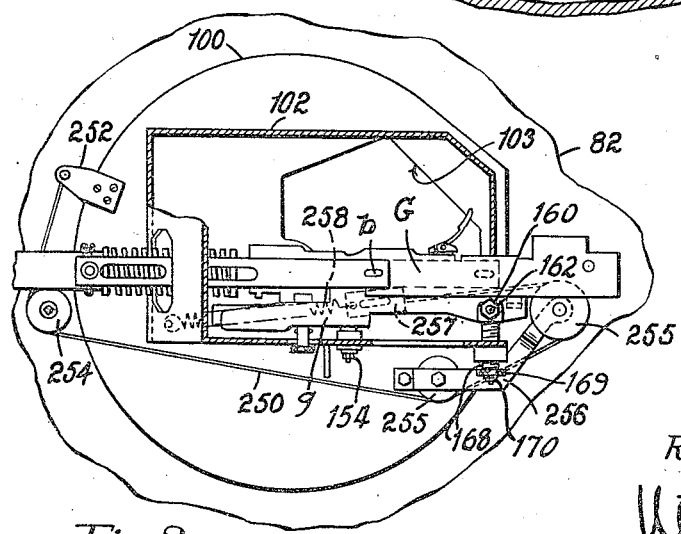
Inventor
René E. Duplessis
By his Attorney Dec. 20, 1949     R. E. DUPLESSIS     2,491,608
POWER-OPERATED GUN TURRET AND
CONTROL MECHANISM THEREFOR
Filed April 13, 1945     15 Sheets-Sheet 2
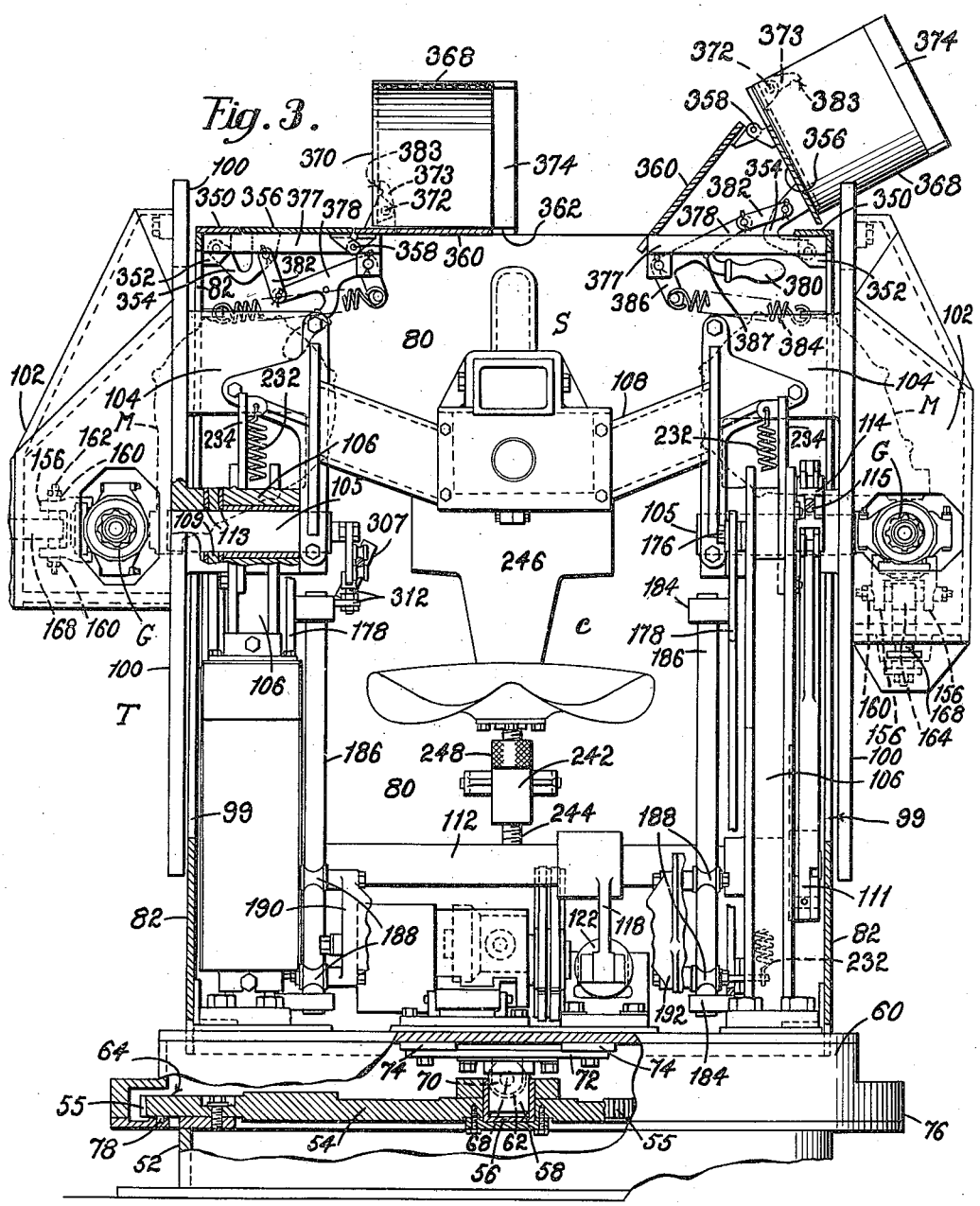
Fig. 3.
Inventor
René E. Duplessis
By his Attorney

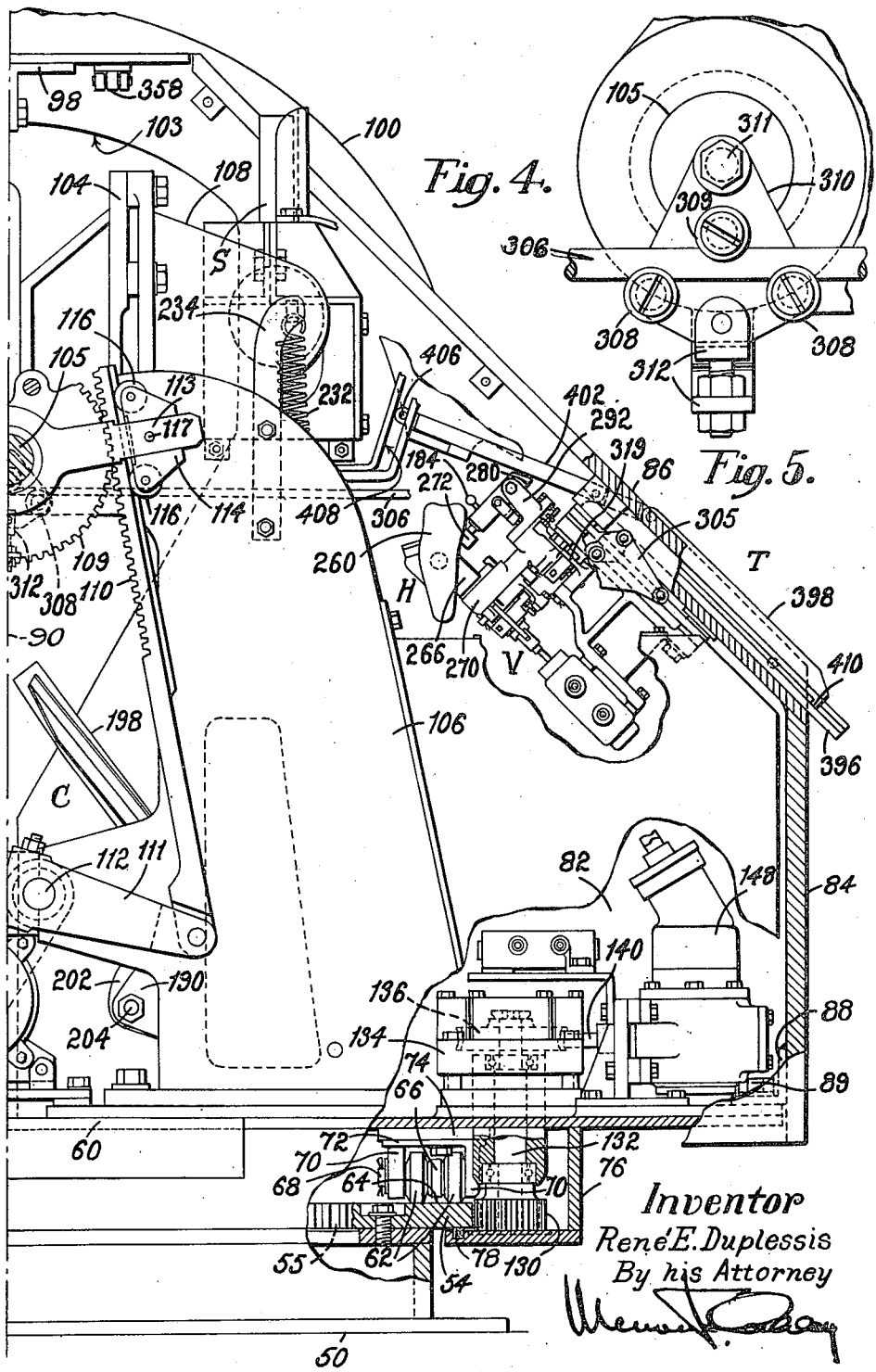

Inventor
René E. Duplessis
By his Attorney

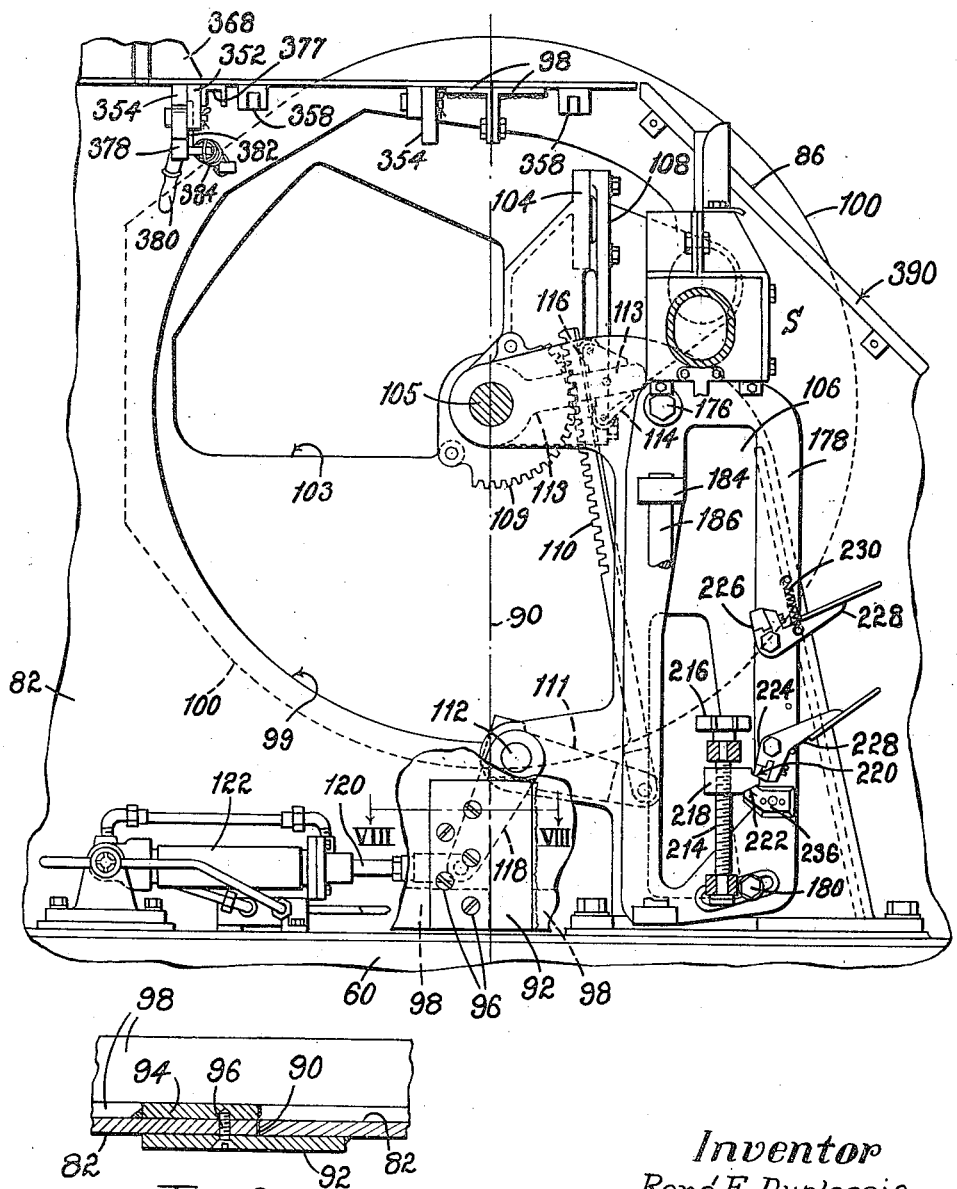

Dec. 20, 1949     R. E. DUPLESSIS     2,491,608
POWER-OPERATED GUN TURRET AND
CONTROL MECHANISM THEREFOR
Filed April 13, 1945     15 Sheets-Sheet 6

Inventor
René E. Duplessis
By his Attorney

Dec. 20, 1949

R. E. DUPLESSIS
POWER-OPERATED GUN TURRET AND
CONTROL MECHANISM THEREFOR

Filed April 13, 1945

Inventor
Reneˊ E. Duplessis
By his Attorney

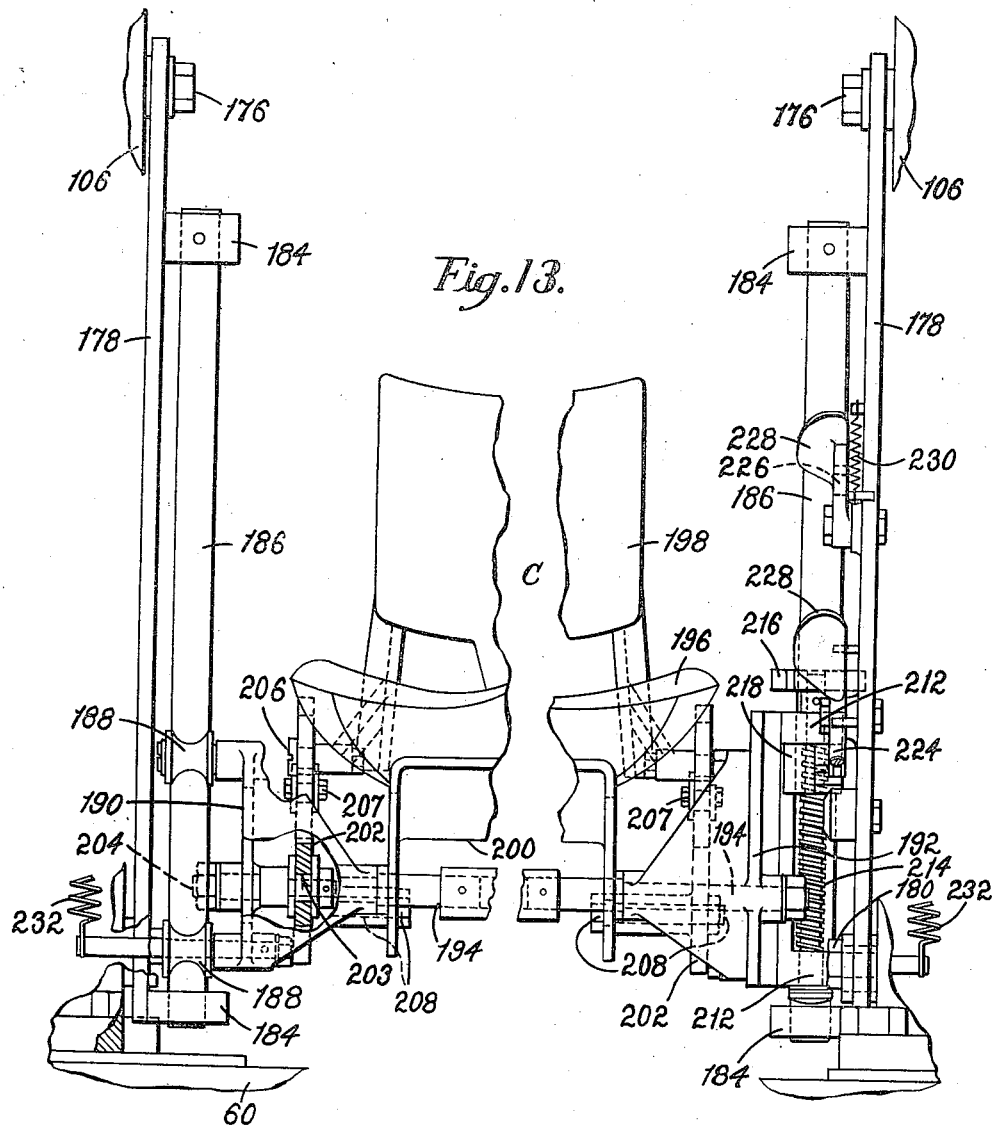

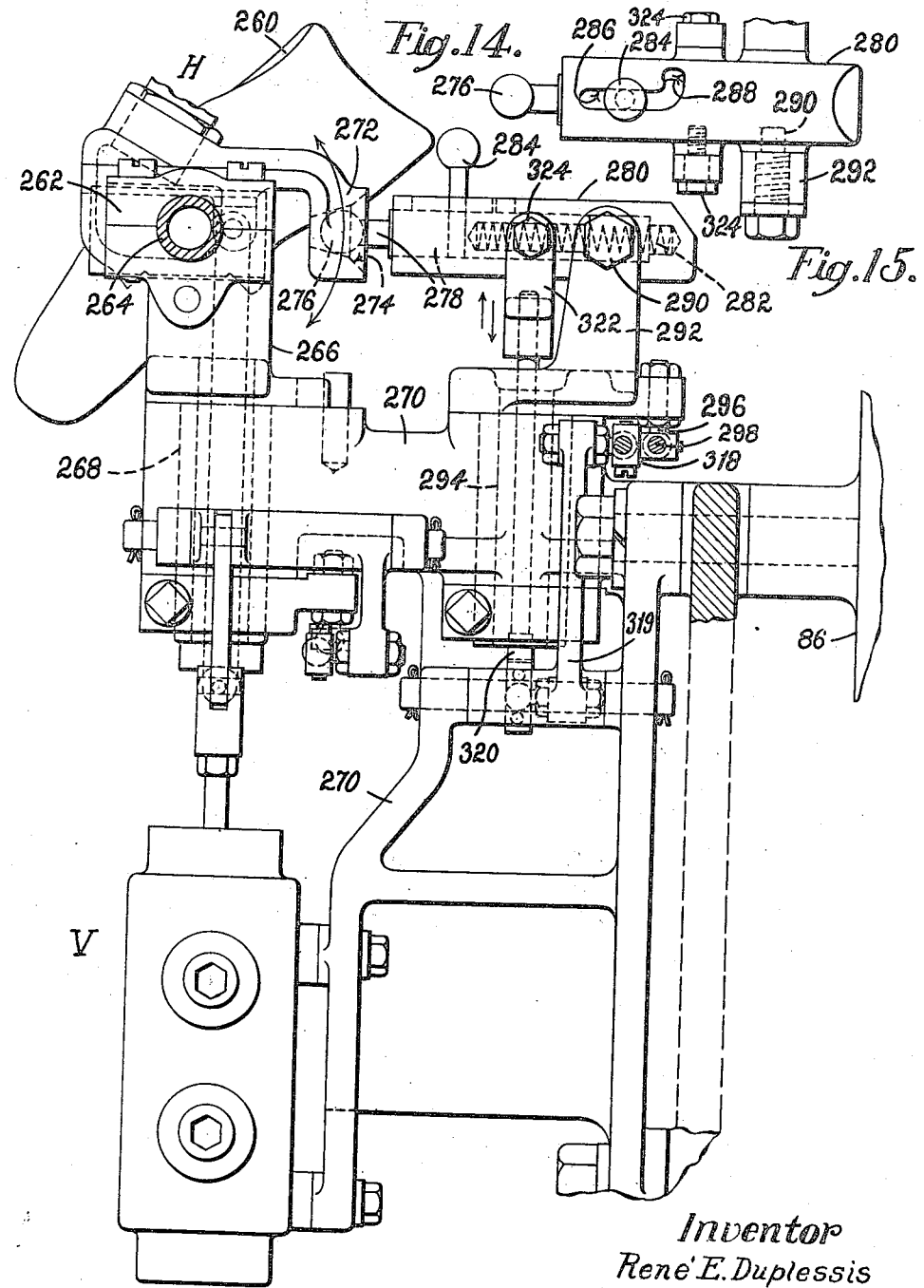

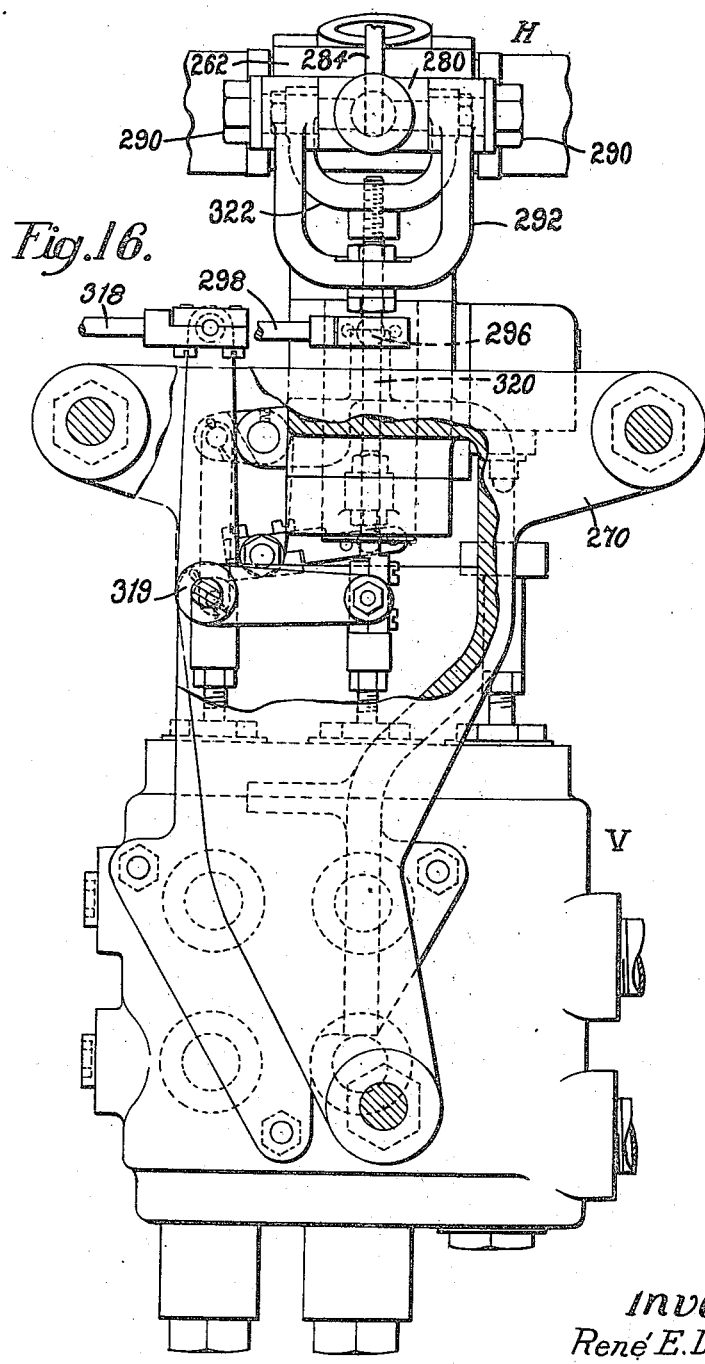

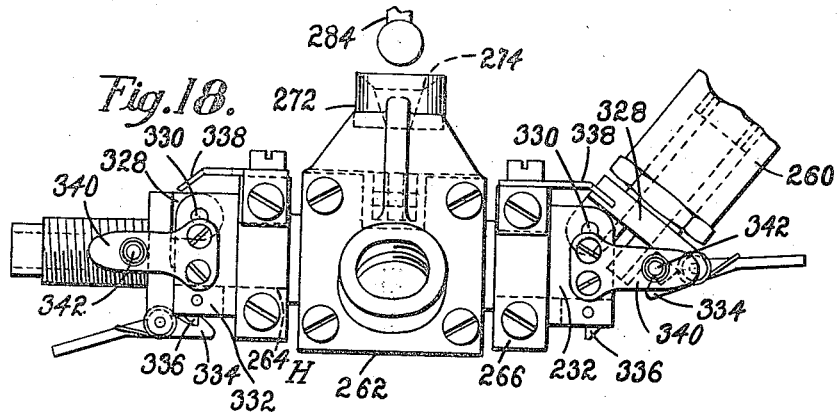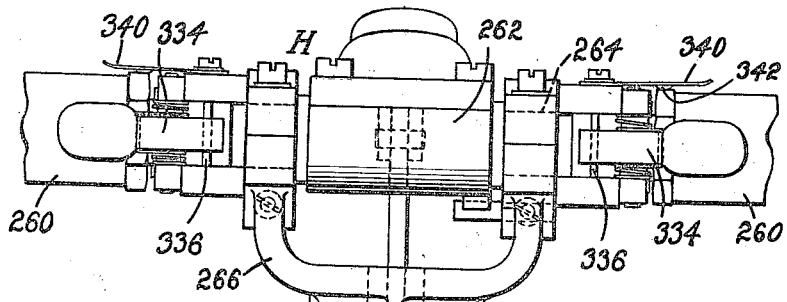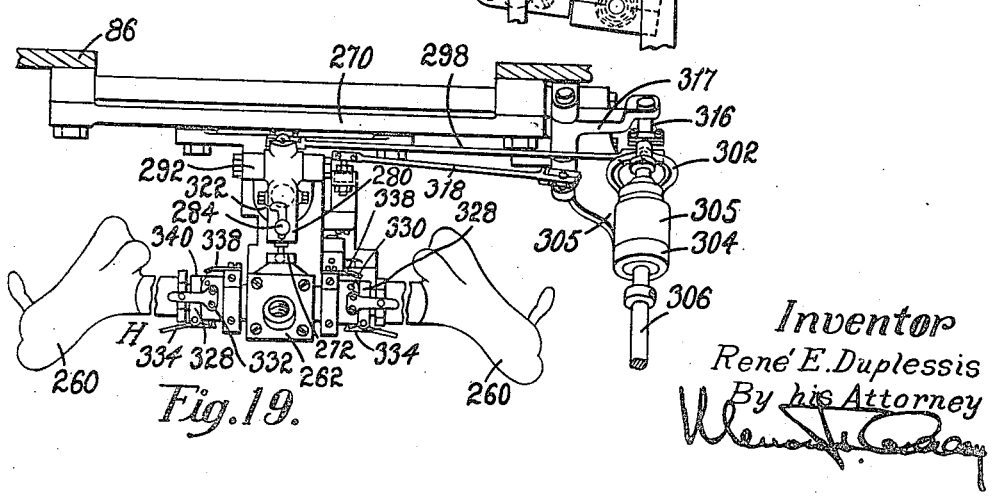

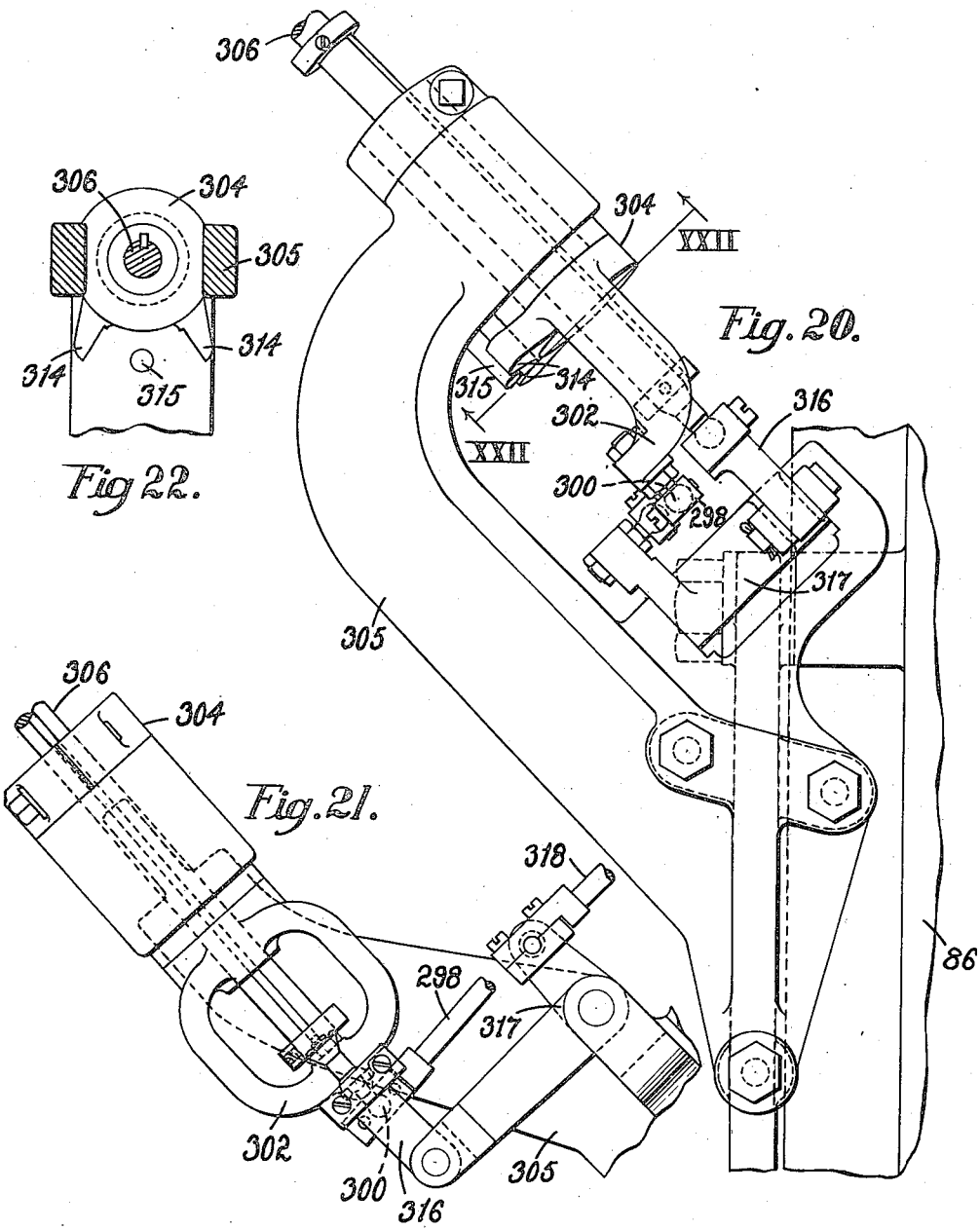

Dec. 20, 1949 R. E. DUPLESSIS 2,491,608
POWER-OPERATED GUN TURRET AND
CONTROL MECHANISM THEREFOR
Filed April 13, 1945 15 Sheets-Sheet 14
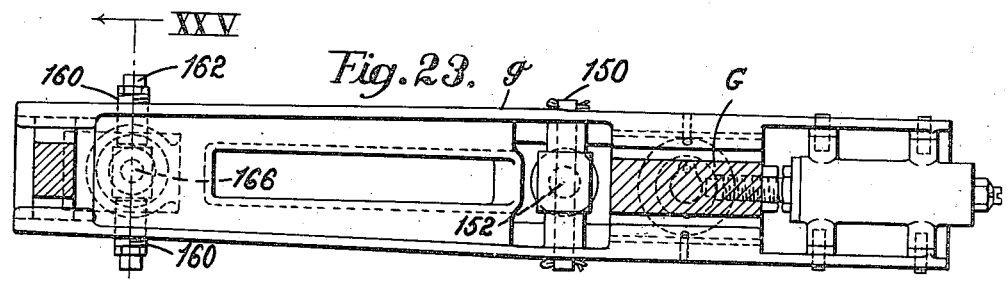
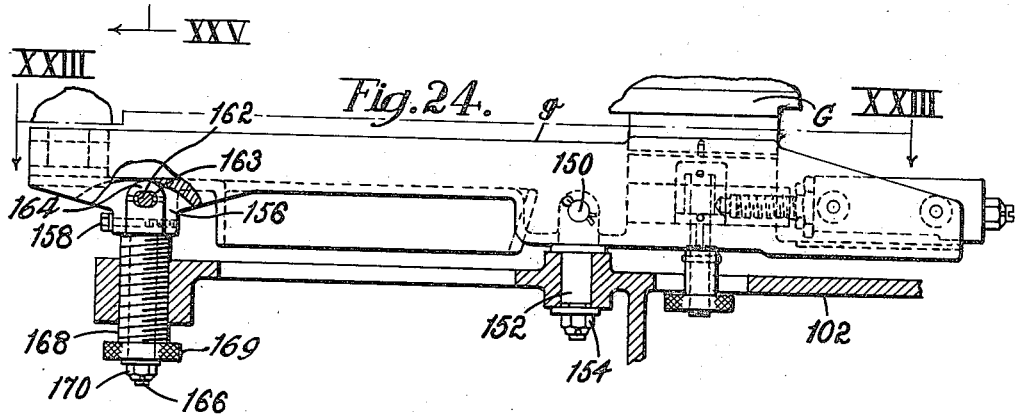
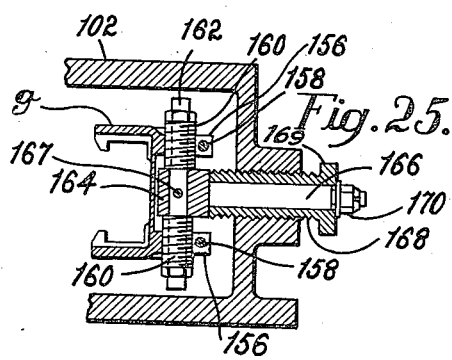
Inventor
René E. Duplessis
By his Attorney

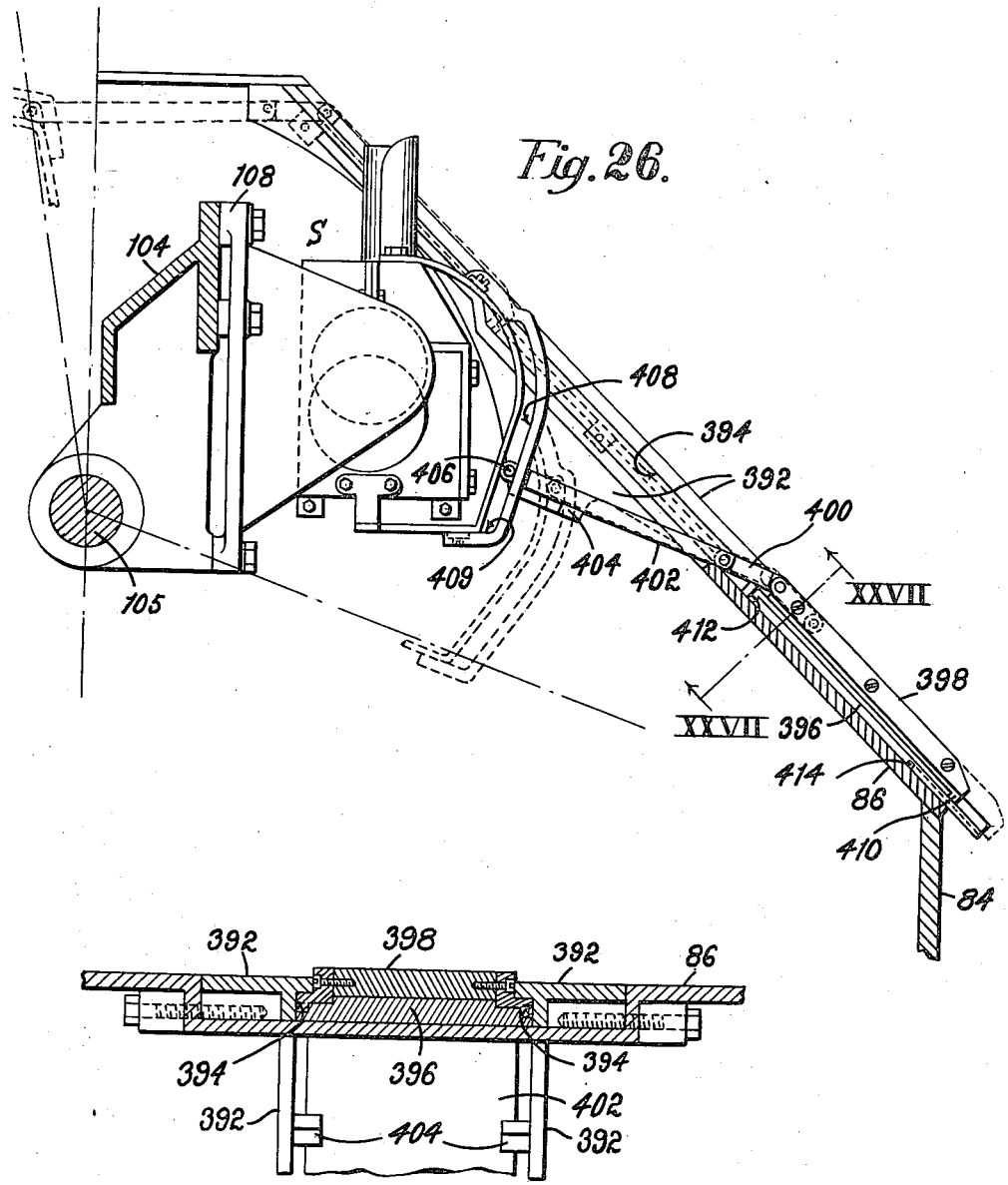

Patented Dec. 20, 1949

2,491,608

UNITED STATES PATENT OFFICE 2,491,608

POWER-OPERATED GUN TURRET AND CONTROL MECHANISM THEREFOR

René E. Duplessis, Beverly, Mass., assignor to United Shoe Machinery Corporation, Flemington, N. J., a corporation of New Jersey Application April 13, 1945, Serial No. 588,176

7 Claims. (Cl. 89—41)

My invention relates to turrets upon which guns are mounted and which protect the ammunition, the various operating and controlling instrumentalities and the gun-crew. More particularly, the invention involves organizations in which the guns are directed in azimuth for their discharge by movement of the body of the turret upon a base, and in elevation by their movement upon the turret.

The invention has as an object the provision of a turret, in which the guns are securely mounted for their elevational movement by means occupying relatively little space within the turret, leaving room in which the gun-crew and contained objects may be stably and conveniently positioned, the body of the turret affording a high degree of protection and the interior being readily accessible. For the attainment of this object, a table rotatable upon a base has rising from it the walls of a turret-body, in the opposite side walls there being openings, each covered by a rotatable plate upon which a gun is mounted for its movement in elevation by rotation of the plate. From the table within each side wall a standard rises, and in which turns a spindle projecting from the corresponding plate. The two plates are preferably connected by a beam, the plates and beam furnishing a carrying unit for the guns and the sight which determines their direction. To this carrier a gear is fixed, it receiving power for the direction of the guns through a rack, which is reciprocated by a motor mounted upon the table. The rack may be pressed into mesh with the gear by means which may be varied to ensure proper engagement. The azimuth movement of the guns is obtained by rotation of the table upon the base, there being a gear secured to the base and provided with a marginal track and with a central socket, the table having pairs of supporting rolls rotatable upon its underside and traveling over the track, and a central spindle turning in the socket. A shaft rotatable by a motor upon the table has a pinion meshing with the gear to turn the table. To absorb the shocks to which the table may be subjected, the rolls are preferably yieldable. To give full access to the interior of the turret-body, it may be in separable sections, the fastenings for the sections being so applied that none fully penetrates the walls, and so is not likely to be driven into the interior by bullets. Entrance to the assembled turret-body may be had through the top, where an opening is provided with sectional covers hinged to the side walls to be raised and leave a central opening, there being an opening in the cover-sections over which is a hinged hood to receive and protect the head of an occupant of the turret during scanning. There is means for maintaining the cover-sections raised and for counterbalancing their weight during their manipulation. The sight is movable with the guns in elevation behind an opening in the front wall of the turret. For this opening there is a movable closure, and the movement of the sight is communicated to the closure, so that only such opening may be left as is necessary for the action of the sight. Preferably, the closure consists of two slides, one above the other, the sight first moving one of the slides, as the upper, to cover the opening partially, this movement being thereafter communicated to the second slide to give a further closure.

The invention also provides a chair for the gunner by which his eye may be accurately positioned with reference to the sight in its various positions for firing, and which may readily be raised for scanning, while protecting him from contact with adjacent objects during the change; means for mounting the guns upon the turret which permits their proper direction by boresighting; means for charging the guns under power; and means by which a second man of the crew may control the motors for directing the guns, instead of or to assist the gunner.

A particular embodiment of my invention is illustrated in the accompanying drawings, in which Fig. 1 shows the turret in perspective;

Fig. 2 is an enlarged detail in side elevation of the gun-charging mechanism;

Fig. 3, a broken front elevation taken within the turret, the gunner's chair being omitted;

Fig. 4, a broken side elevation of the forward portion of the turret;

Fig. 5, a detail in side elevation of the guiding means for the second man's valve-controlling rod;

Fig. 6, a view, similar to Fig. 4, of the rear portion of the turret;

Fig. 7, a broken side elevation of the interior of the turret, with a portion of the chair-supporting and -adjusting means;

Fig. 8, a sectional detail of the connection between the walls of the turret-sections, taken on the line VIII—VIII of Fig. 7;

Fig. 9, an enlarged detail in side elevation of a portion of the elevating mechanism for the guns;

Fig. 10, a sectional detail on the line X—X of Fig. 9;

Fig. 11, a broken top plan view of the mechanism by which the turret is turned in azimuth;

Fig. 12, a side elevation of the gunner's chair and its adjusting mechanism;

Fig. 13, a broken front elevation of the elements appearing in Fig. 12;

Fig. 14, a side elevation of the gunner's motor-controlling valve and grip, together with a portion of the second man's motor-controlling means;

Fig. 15, a top plan view of the device for disconnecting the second man's controlling means;

Fig. 16, a rear elevation corresponding to Fig. 14;

Fig. 17, a view similar to Fig. 16 of the grip mechanism only, particularly illustrating the means for retaining the hand-holds in active and inactive relation;

Fig. 18, a top plan view of the elements of Fig. 17;

Fig. 19, a detail in plan of the transverse connections between the valve-controls;

Fig. 20 shows, in side elevation, a portion of the connections between the controls, the supporting wall being turned to a vertical position;

Fig. 21 is a top plan view of the elements of Fig. 20;

Figure 6:
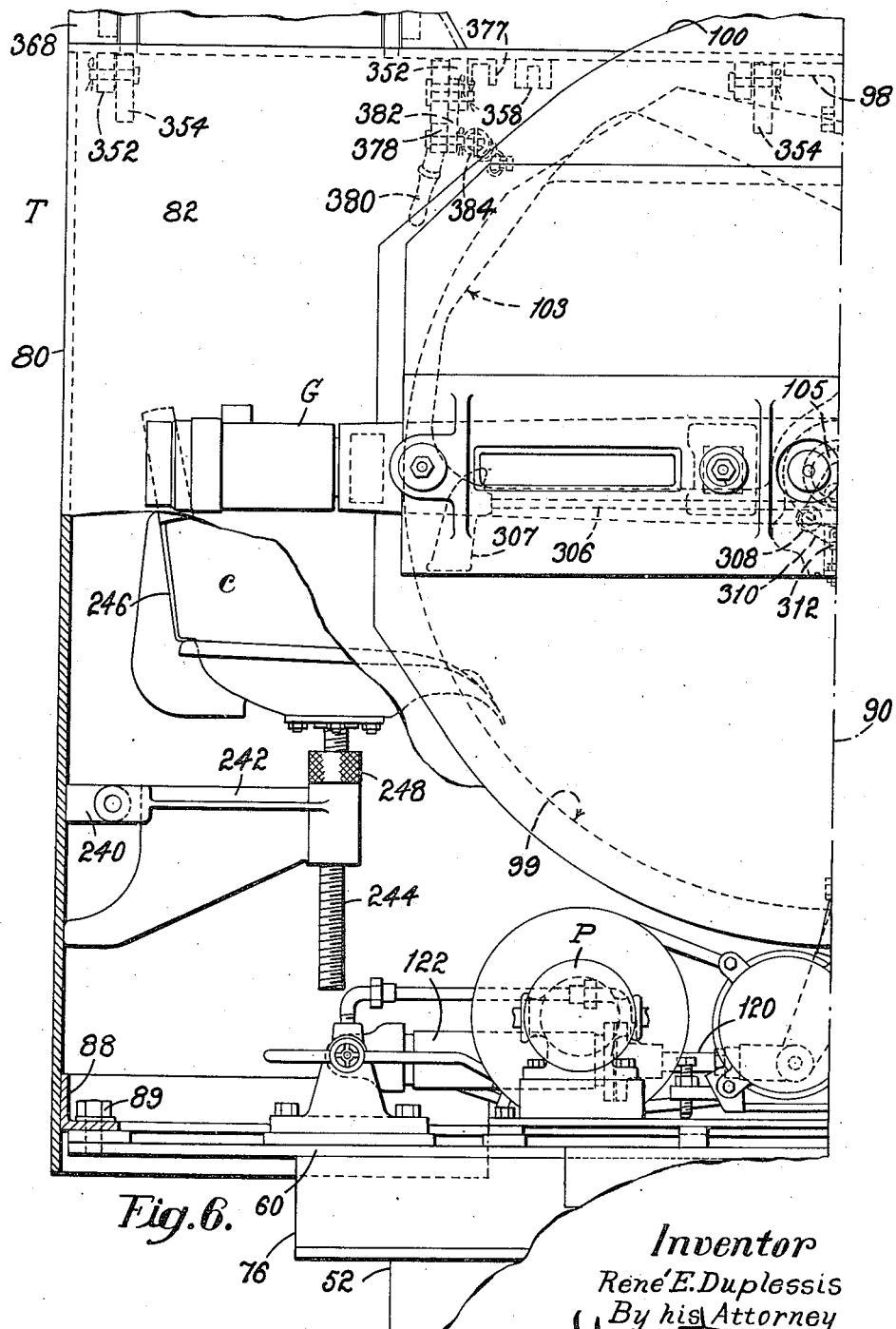

Fig. 22, a sectional detail on the line XXII—XXII of Fig. 20;

Fig. 23 shows a portion of a gun and its mounting upon the turret, the view being a horizontal section on the line XXIII—XXIII of Fig. 24;

Fig. 24 is a top plan view of the elements of Fig. 23;

Fig. 25, a sectional detail on the line XXV—XXV of Fig. 23;

Fig. 26, a vertical sectional detail taken longitudinally through the front of the turret, illustrating the closing means for the sight-opening; and Fig. 27, a transverse section on the line XXVII—XXVII of Fig. 26.

A base 50, adapted for either stationary or mobile mounting, has fixed upon it a flanged annulus 52. Upon the annulus is secured a disk 54 (Figs. 3 and 4) provided with a toothed periphery 55. At the center of the disk, a socket 56 is mounted, this receiving a spindle 58 depending from a table 60 rotatable upon the annulus and centered by the spindle. The table is supported by a plurality of pairs of rolls 62, 62, spaced from each other about its underside and running over a track furnished by the upper marginal face 64 of the disk. The rolls of each pair are spaced from one another by a collar 66, the rolls and collar being rotatable upon a horizontal spindle 68 mounted in depending lugs 70 of a plate 72, which is attached to the underside of the table by screws passing through blocks 74 spacing the plate from the table. The plate may yield to absorb the shocks produced in the travel of the turret over the ground or of the table over the track. About the table is a skirt 76, having a flange extending under the disk 54 with an interposed packing strip 78 guarding against the entrance of dirt to the track and to the bearings of the spindle 58 and of the rolls 62.

On the table is supported the body of the turret T. This consists of a vertical rear wall 80 (Fig. 6), opposite vertical side walls 82, 82 (Fig. 3), and a front wall having a lower vertical portion 84 and an upwardly and rearwardly inclined portion 86 (Figs. 1 and 4). The walls are of sheet-metal, cut and bent to form, being welded together where necessary. To the table, angle-strips 88 are secured by screws 89, the vertical flanges of the strips being welded to the turret-walls, this giving secure attachment without projecting fastening means, which may be destroyed by gun-fire. To facilitate access to the interior of the turret for the installation of fittings and for making repairs, it is formed in two sections, being divided transversely and with edges abutting along the vertical plane 90. To connect the sections, the forward portion has welded to it at the bottom of each side wall a flange 92 (Figs. 7 and 8) extending over the rear section. Opposite this extension, welded to the corresponding wall of the rear section, is a reinforcing plate 94, and screws 96 pass through openings in the flange 92 and are threaded into the plate 94 without passing through it, leaving the inner surface unbroken. This eliminates fastenings, which, because of their extension through the turret-wall, might be driven into the interior by bullets. At the top of the sections, at opposite sides of the plane 90, angle-irons 98 are welded to the walls 82 and bolted together, this securing means being entirely within the turret. In the front wall 86 and at the top of the turret are openings, the purposes of and closures for which will be described later.

In each of the turret-walls 82 is a large opening 99, generally circular in form and covered by a disk-like plate 100, which carries one or more guns G and which is rotatably mounted to direct fire of said guns in elevation, the direction of the guns in azimuth being obtained by rotation of the table 60 on the disk 54. The guns are directly attached to and protected by hoods 102 carried upon the opposite plates, and into each hood is an opening 103 through the carrier-plate, by which operating access may be had to the gun. The right-hand gun, as viewed from the gunner's position, is mounted on the outer vertical wall of its hood and the left-hand gun on the lower horizontal wall. This is for convenience in arranging the two corresponding magazines M, M (Fig. 3). Each plate 100 has projecting inwardly at the front of the opening 103 an extension 104, in an angular end-portion of which and in the plate are carried the ends of a spindle 105 (Figs. 3 and 7), journaled in a standard 106 secured to the front of the table close to the wall, the opening 99 through which is covered by the plate. The opposite plate-projections are joined at their forward sides by a tie-beam 108. Together, the plates and beam furnish a rotatable gun-carrying unit.

Figure 9:
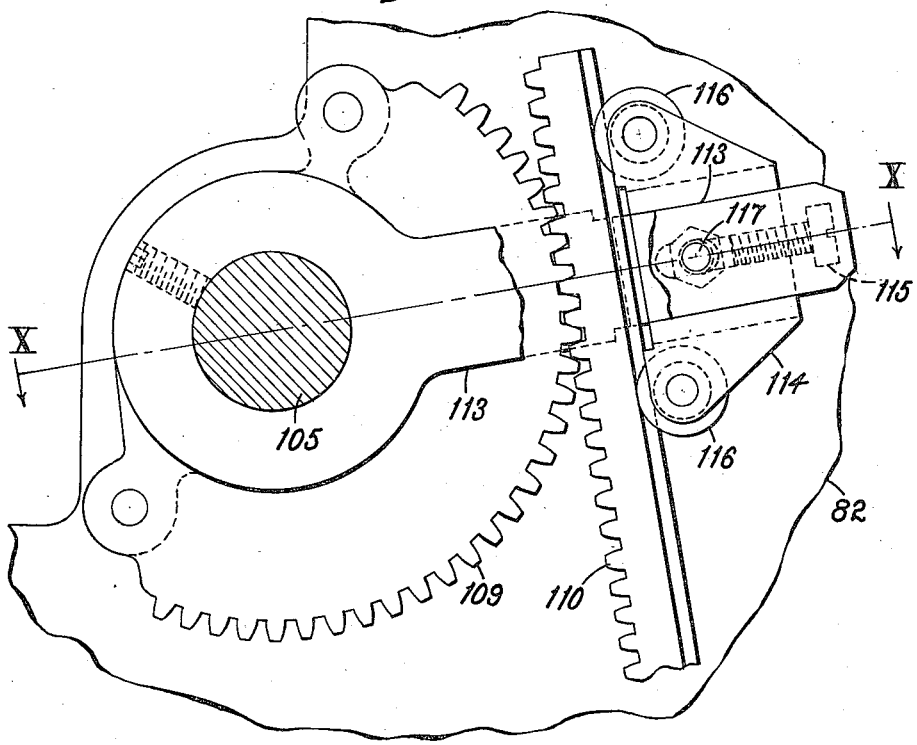
Figure 10:
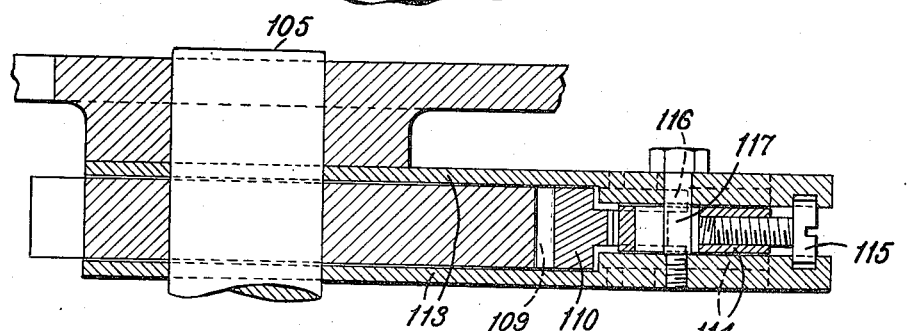

To turn the carrying unit and thereby direct the fire of the guns in elevation, as determined by a sight S carried by the beam 108, there is attached to each plate, between it and the standard, a gear-segment 109 (Fig. 4). Meshing with each segment is a rack 110, pivoted to an arm 111 fast upon a shaft 112 journaled in extensions from the standards. To ensure that each rack meshes correctly with its segment, there loosely surrounds each spindle 105 the rear extremities of two arms 113, 113, lying at opposite sides of the rack and held in parallel relation by a screw 117 connecting them (Figs. 9 and 10). Between the arms at the outer side of the rack is a carrier-plate 114, into the outer edge of which is threaded a screw 115 held against longitudinal movement by the engagement of its head with opposite slots in the inner faces of the arms. Rolls 116, rotatable upon the opposite extremities of the carrier-plate, contact with the outer side of the rack and maintain it in the correct relation to the segment 109. By turning the screw 115, the rack may be urged toward the segment, as desired. To the shaft 112, near its center (Fig. 3), is secured an arm 118 joined to the rod 120 of a piston operating in a cylinder 122 pivotally mounted upon the table 60 (Fig. 7). Hydraulic pressure is supplied to the cylinder from a pump P (Fig. 6) to reciprocate the piston, and through the intermediate connections turn the plates 100 in one direction or the other, under the control of a gunner's valve V (Fig. 4).

Figure 11:
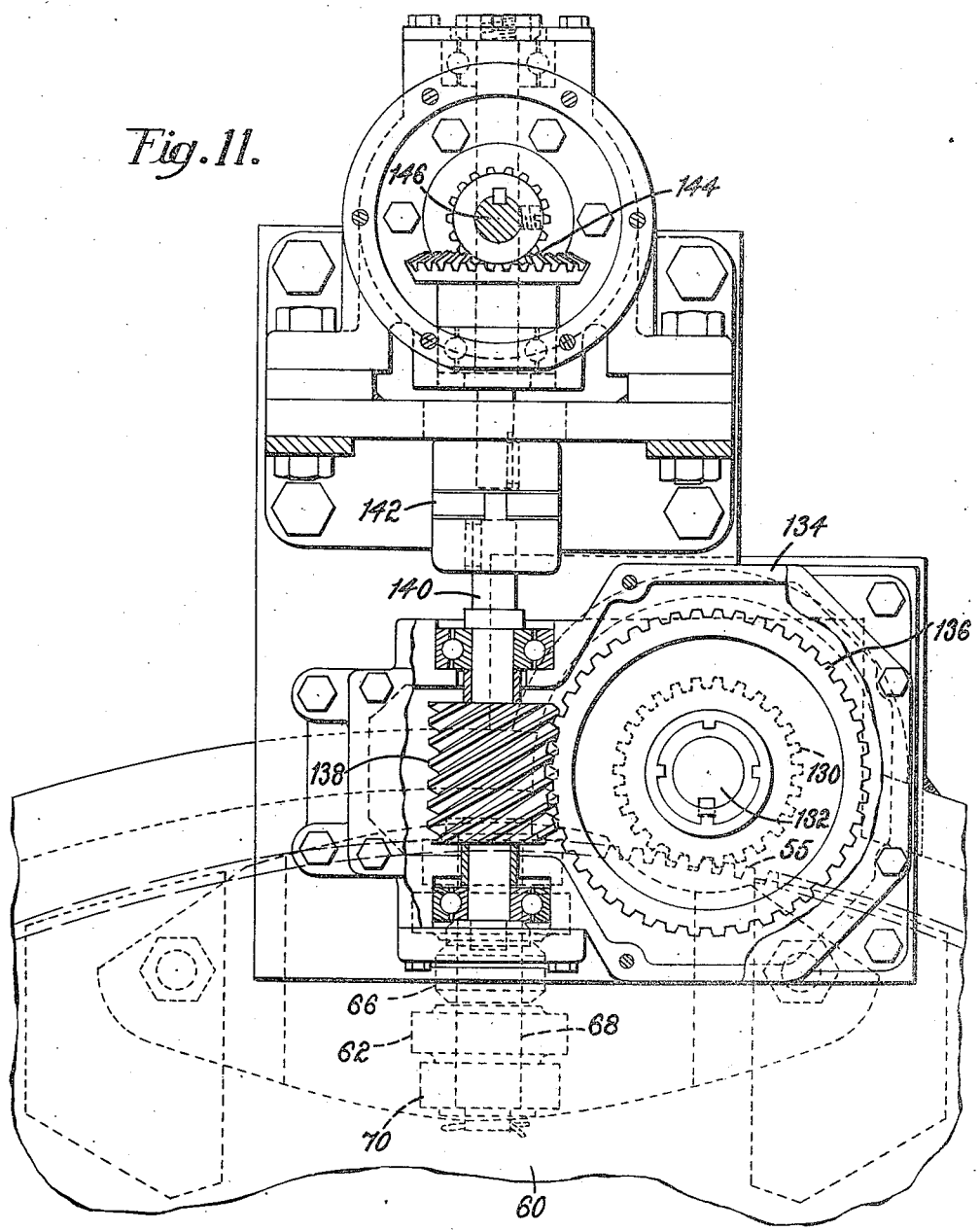

For the rotation of the table 60 bearing the turret T to direct the fire of the guns in azimuth, there meshes with the gear-teeth 55 on the stationary disk 54 a pinion 130 fast on a vertical shaft 132 journaled in a casing 134 secured at the front of the table 60 (Figs. 4 and 11). Fast upon the upper extremity of the shaft is a worm-wheel 136 meshing with a worm 138 on a horizontal shaft 140. Through a coupling 142 in the shaft and bevel-gearing 144, the connection of the pinion 130 to the shaft 146 of an hydraulic motor 148 is completed. This motor receives pump-pressure controlled by the gunner's valve V.

The guns G are mounted in a normally fixed position upon the hoods 102 by means which permits them to be bore-sighted or adjusted through angles in azimuth and elevation to agree with the sight S. As appears in Figs. 23, 24 and 25, and assuming with respect to references to horizontal and vertical directions that the right-hand gun is being considered, the cradle g of each gun is pivoted at 150 to the head of a spindle 152, rotatable in the vertical wall of the hood 102 and retained in place, while allowing the spindle to turn, by a nut 154 threaded upon said spindle. The cradle is thus allowed to swing horizontally about the pivot 150 and vertically with the spindle 152, in planes at right angles to each other. On the upper and lower portions of the cradle are divided lugs 156, 156, portions of each of which may be drawn toward each other by a screw 158 to clamp in place between them a tubular screw 160. These screws 160 receive, with a turning fit, a spindle 162, passing through a slot 163 in the head 164 of a spindle 166, it being held against longitudinal displacement by a pin 167 extending into openings in the head. The spindle 166 passes, with a turning fit, through a tubular screw 168 threaded into the hood-wall. A nut 170 upon the spindle 166 normally clamps the screw 168 and the spindle against rotation. To vary the direction of the gun in azimuth, the nut 170 is loosened and the screw 168 turned by a finger piece 169 to swing the gun horizontally to the extent desired. In this adjustment, the cradle g turns about the pivot 150. The lugs 156, which swing in an arc about the axis of the pivot, are permitted by the slots 163 to shift along the spindle 162 to compensate for the rectilinear movement of the latter. The elevation of the gun is altered by freeing the clamps 156, then backing off one screw 160 and setting up the other. The pivots which permit this are the forward spindle 152 and the rear spindle 166. Here again, the slots 163 furnish a clearance at each side of the spindle 162 to allow the arcuate movement of the cradle. After the respective adjustments, the clamping means 170 and 158, 156 are tightened. In these operations, all adjustments are made at the rear of the gun, it being unnecessary to disturb the forward pivotal connections. These follow freely the rear adjustments, yet, when the latter are locked, the forward mounting becomes rigid.

It is to be observed that the shock of discharge of the gun is received upon the extended surface of the spindle 162, and that the head 164 need not be machined to a fit, because of the adjustability of the ample flat contacting ends of the screws 160. The parts of the mount are simple and few in number and occupy little space between the cradle g and the walls of the hood 102.

The turret T may contain two men, one to determine the direction of fire of the guns by rotation of the table 60 and of the plates 100 by actuation of the valve V to control the hydraulic mechanism, and the other to supply ammunition for and otherwise service said guns. The gunner occupies a chair C situated between the standards 106 (Fig. 4) and arranged for ready movement between two positions, these being respectively for scanning and firing. Pivoted at 176 near the upper portion of each standard is a mounting plate 178 (Figs. 12 and 13), which may be retained in different angular positions about its pivot by the screw 180 passing through an arcuate slot 182 in the bottom of the plate and threaded into the standard. Fixed in upper and lower lugs 184, 184 upon the inner side of each plate is a vertical rod 186. Guided by the rods are upper and lower pairs of rolls 188, 188, the grooved peripheries of which partially embrace said rods. The rolls are rotatable on a carrier 190, at the right of the occupant of the chair, and a left-hand carrier 192, joined by a tie-rod 194 to furnish a carrier-frame traveling on the rods 186, 186. The chair C, having a seat 196 and a back 198, is supported upon the tie-rod by a yoke 200 secured to the forward portion of the seat and having transversely spaced slots 201, 201 through which the tie-rod passes and which are inclined upwardly and forwardly toward the front of the seat. The chair may thus tilt forward and back and also move bodily upon the tie-rod as a guide. At the rear of each of the carriers 190 and 192, a bell-crank-link 202 has a lower arm extending in a generally horizontal direction, in which arm is a longitudinal slot 203 receiving a projection 204 from the carrier. Each lower link-arm is pivoted at 208 to the rear of one side of the yoke 200. The links may thus float upon the carriers, having a compound movement similar to that of the chair. An upwardly extending arm of each link has an arcuate slot 205 through which extends a projection 206 from the chair-back. Below the projection a stop 207 is clamped to the link and may be adjusted to different positions, to limit the degree of rearward inclination of the chair-back and the angle at which the eye of the gunner is presented to the sight. Excessive forward displacement will be prevented by engagement of the projections 206 with the upper ends of the slots 205.

Figure 12:
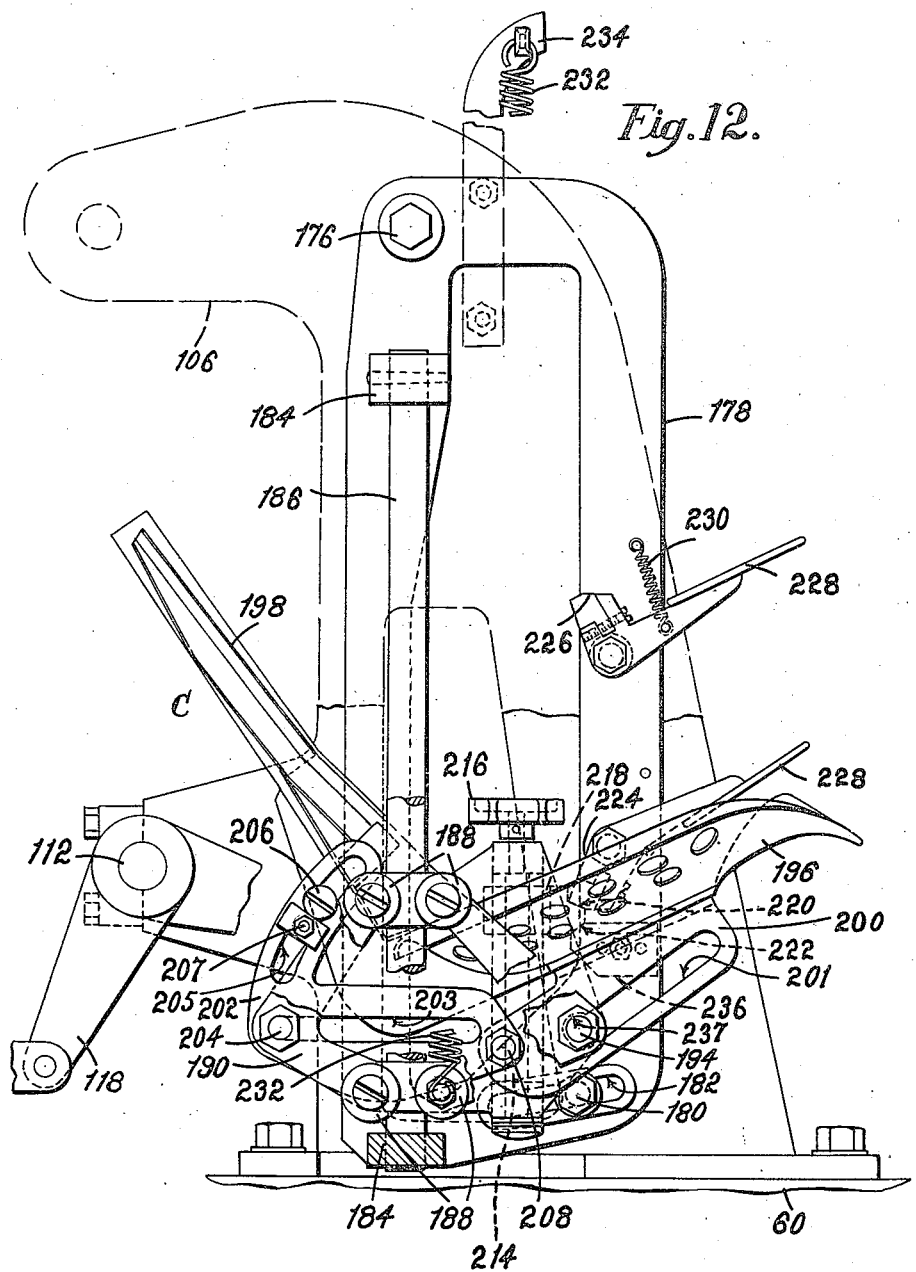

In upper and lower lugs 212, 212 on the carrier 192 is a vertical screw 214, rotatable by a hand-wheel 216 fixed to its upper extremity. Rotation of the screw raises or lowers a nut 218, held against turning by engagement with a wall of the carrier along which it moves. The nut has an upper contact-surface 220 and a lower contact-surface 222 (Fig. 12). These surfaces may be engaged, respectively, by latches 224 and 226 pivoted on the left-hand mounting plate 178 and each provided with a hand-hold 228. The latches may be held in normal position for engagement with one of the contact-surfaces of the nut 218 by a spring 230, as shown for the latch 226, and by gravity, as is the latch 224. A tension-spring 232 joins each of the carriers to a bracket 234, rising from the corresponding standard 106. The springs tend to lift the chair until its travel is stopped by the engagement of the upper rolls 188 with the upper lugs 184.

Under the influence of the occupant's weight, the chair will descend until the surface 222 of the nut 218 strikes a stop-plate 236 secured to the left-hand plate 178. In this position, in which the gunner discharges the guns G as determined by the sight S, the chair is held by engagement of the latch 224 with the nut-surface 220. When the gunner wishes to scan, he releases the latch 224 by depressing its hand-hold 228 and partially relieves the chair of his weight. The springs 232 lift it, the nut 218 thrusting aside the latch 226. When the gunner's weight is again applied to the chair, the nut-surface 222 rests upon the latch 226, and the chair is held up until pressure upon the upper hand-hold 228 frees it, to descend to its initial firing position under the weight of the gunner. To bring his eye into the best vertical relation to the sight S, the gunner may raise or lower the chair C by turning the screw 214 through rotation of the hand-wheel 216. This will shift the nut 218 correspondingly, and thereby vary the vertical relation of the nut-surface 220 which contacts with the lower latch 224 when the chair is in firing position. When the gunner leans back for firing at the maximum elevation, the chair is in the position appearing in Fig. 12. The chair-back is tilted rearwardly to the angle permitted by the adjustable stops 207, and the seat has slid forward on the rod 194, an offset-portion 237 of each slot 201 receiving the rod and tending to retain the chair against clockwise displacement. If this angular position of the chair places the eye of the gunner too far from or too near to the sight S, this may be corrected by angular adjustment of the mounting plates 178 carrying the chair, this adjustment being secured by the screws 180. As the guns and sight are lowered, the chair follows the change in their direction by tilting forward about the rod 194, the slot-offsets 237 remaining in engagement with this. The chair-projections 206 rise in the slots 205 of the links 202. After firing, if the gunner wishes to scan from the chair, raised from the latch 224 and held by the latch 226, he leans forward, lifting and pressing back upon the front of the seat. The slot-offsets now leave the rod 194, and the yoke 200 slides rearwardly upon said rod, until the forward extremities of the slots reach it. At the same time, the links 202 move back along the carrier-projections 204, the chair-projections 206 shifting toward the upper ends of the slots 205. The body of the gunner has thus been carried rearwardly sufficiently to avoid contact with the sight as he rises.

For the second man, a chair c is provided (Figs. 3 and 6). To a bracket 240 fixed to the rear wall 80 of the turret is pivoted an arm 242. Extending vertically through an opening in the forward extremity of the arm is a threaded spindle 244, to the top of which is secured the bottom of the chair c, which is provided with a back 246. The height of the chair may be altered by rotation of a nut 248 threaded upon the spindle and resting upon the bracket.

The second man may service the guns, supplying them with ammunition contained in the magazines M carried by said guns and also stored within the turret, to be applied, as required, to the guns. If in its discharge a gun jams, it may be charged through a cable 250 (Figs. 1 and 2). This leads from a bracket 252, projecting from the periphery of the plate 100 upon which the gun is mounted, over a roll 254 rotatable on the wall 82, and then over two rolls 255, 255 rotatable on a bracket 256 attached to the plate. The cable has at its rear extremity a terminal 257 provided with an opening to receive the breech-bolt-stud b. This terminal when inactive is held in place, out of the path of the stud, by its connection to a tension-spring 258 extending from it to the hood 102. When it is desired to charge the gun, the opening in the terminal is applied to the breech-bolt-stud and the plate 100 on which the gun is mounted is turned by the motor-cylinder 122, so said gun is upwardly inclined. As the bracket 252 travels away from the roll 254, it pulls upon the cable, so the terminal is drawn rearwardly toward the rolls 255 to carry the breech-bolt back to its cocked position. The charging having been completed, the terminal is removed from the stud and held out of its path by the spring, which expands and contracts as the plate 100 oscillates in the directing of the gun.

Reference has been made to the valve V by which the gunner may control the hydraulic mechanism for directing the guns G. There is shown, in Figs. 4, 14, 16, 17, 18 and 19, grip mechanism H, through which the gunner may actuate this valve to cause the two movements of the guns. Both the valve and grip mechanism are generally conventional. The latter has hand-holds 260, 260 projecting from opposite sides of a body portion 262 pivoted at 264 on a yoke 266 for rotation about a horizontal axis. The yoke is pivoted at 268 for movement about a vertical axis on a bracket 270 attached to the front wall 86 of the turret. When the hand-holds are rotated about the pivot 264, the plates 100, with the guns, are turned by the cylinder 122 in elevation. When the hand-holds are swung laterally about the pivot 268, the turret T with the plates and guns are shifted in azimuth by the motor 148.

It may be desirable for the second man to aid the gunner in the control of the direction of fire of the guns or to take over complete control. Means for effecting this is illustrated in Figs. 4, 6, 14, 16 and 19 to 22. Projecting rearwardly from the body 262 of the grip mechanism H is an arm 272 having at its forward side a socket 274. In this socket may lie the spherical end 276 of a plunger 278 movable in a casing 280. The plunger-end is held normally in the socket by an expansion-spring 282 contained in the casing. The gunner may render ineffective the connection to the arm 272 for the secondary control of the valve V, by withdrawing the plunger-end from the socket by a finger-piece 284 rising from the plunger and movable along a slot 286 in the casing. When the finger-piece is turned into the angular end 288 of the slot, the connection will remain broken until the plunger is released. Near its forward extremity, the casing 280 is trunnioned at 290 on a yoke 292 pivoted at 294 to turn on the bracket 270. Depending from the base of the yoke at its forward extremity is a projection 296, from which a link 298 leads toward the right of the turret. The outer end of the link is pivoted to a projection 300 (Figs. 20 and 21) on a forward extension 302 from a sleeve 304 rotatable in a bracket 305 fixed to the turret-wall 86. In the sleeve, splined to rotate with and to move bodily through it, is a rod 306 extending back at the right of the turret and terminating just in front of the chair c, where it is provided with a hand-grip 307 (Fig. 6). At an intermediate point, the rod is supported between a pair of lower grooved rolls 308, 308 and an upper roll 309, shown in part in Fig. 6 and fully in Fig. 5. These rolls are rotatable on a plate 310 hung at the top upon a spindle 311, lying in an axial bore in the adjacent plate-supporting spindle 105. At the bottom, the plate is carried by a bracket 312 fixed to the adjacent standard 106. The guide-rolls are thus securely mounted at a point convenient for their purpose, and without being affected by the rotation of the plate-spindle, which, in part, supports them. When the rod 306 is turned by the second man grasping the grip 307, its splined connection to the sleeve 304 rotates this, correspondingly revolving the projection 300. The extent of this movement is limited by contact of projections 314, 314 from the sleeve 304 with a pin 315 set in the bracket 305 (Fig. 22). Through the link 298 and projection 296 the yoke 292 is turned, causing the plunger 278 in the casing 280 to act on the arm 272 on the gunner's grip mechanism H, turning the body 262 about its axis 268. The valve V will therefore be affected as through the gunner's hand-holds 260 had been manipulated to govern the azimuth movement of the turret.

The forward end of the rod 306 is joined by a link 316 to one arm of a bell-crank-lever 317 fulcrumed upon the bracket 305. From a second arm of the lever, a link 318 extends to one arm of a bell-crank-lever 319, fulcrumed upon the bracket 270. A second arm of the lever 319 is joined to an upwardly extending rod 320 carrying a yoke 322 pivoted at 324 to the opposite sides of the casing 280. When the second man shifts the rod 306 longitudinally through the sleeve 304, the movement is communicated through the bell-crank-lever 317 and the link 318 to the bell-crank-lever 319 and through the rod 320 to the casing 280. The casing is thereby rocked in a vertical plane, and its plunger 278 moves similarly the arm 272 and the body 262 of the gunner's grip mechanism about the pivot 264 to control the elevation of the guns by the plates 100.

The hand-holds 260 of the grip mechanism are normally so situated with respect to the chair C, that, as the gunner rises for scanning, he may strike them and thus accidentally start the motors, particularly that operating the gun-carrying plates 100. To guard against this, the hand-holds are so attached to the body 262, that they may be turned away from the chair toward the forward wall of the turret and there temporarily retained: As may be seen in Figs. 17 and 18, the shank 328 of each hand-hold is pivoted at 330 at its inner forward corner to a lateral extension 332 from the body. In operating position, appearing at the left in Fig. 18, it is secured by a spring-actuated latch 334, pivoted at the inner rear corner of the shank and engaging a projection 336 from the adjacent extension. The latch being freed, the hand-hold may be swung back to the extent determined by a stop 338 secured to the body-extension, and be there yieldably retained by a leaf-spring 340 attached to the top of the extension, as shown at the right in Fig. 18. The spring has a downward projection 342, which rides on the top of the shank and falls behind it when the idle position of the hand-hold is reached. When the gunner pulls the handle into operating position, the spring 340 yields, releasing the hand-hold, which is again secured by the latch 334.

To permit access to the interior of the turret T, to enable the sight S to be directed on the target and to allow the occupants to scan, openings are provided in the turret-walls with associated covers, which, to a considerable extent, close them during action. Extending inwardly from the top of each of the side walls 82 is a horizontal flange 350 (Fig. 3), to each of which and to the adjacent side wall are welded lugs 352. To these lugs, by offset hinges 354, are pivotally connected at each side of the turret an outer cover-section 356 extending between the top of the rear wall 80 and the inclined front wall 86. Hinged at 358 to the inner edge of each section 356 is an inner section 360. The inner margin of each inner section is cut away to furnish an elongated opening 362, leaving only a relatively narrow extension 364 (Fig. 1), the edges of the extensions on the two sections 360 meeting at the center. Through the opening 362 with the covers closed in action, the gunner may scan from his raised chair C. The rear edges 366 of the cover-sections 360 are spaced from the turret-wall 80, leaving an opening to receive the head and shoulders of the second man standing in front of his chair c. He is to a large extent protected by a hood formed in opposite sections 368, 368, each being convex at its upper closed side and with a flat side wall 370 adjacent to the section 356. Each hood-section is hinged at 372 to projections 373 rising from the inner edge of a cover-section 356, to permit it to be thrown back and fully free the opening which it protects. With the hood closed, the second man may look through a slot 374 formed in the adjacent forward edges of the convex walls.

To open the top of the turret to the greatest extent, the cover-sections 356 and 360 may be thrown back, as appears in Fig. 1 and at the right in Fig. 3. To facilitate this, there is fulcrumed on a bracket 377 projecting from the top of each side wall 82 of the turret a lever 378, provided with a depending handle 380. To the end of the lever opposite the fulcrum is pivoted a link 382 joined to the hinge 354 near its connection to the cover-section 356. When one of the handles 380 is forced up by an occupant of the turret, the link 382 lifts the section 356 and with it the section 360, drawing these together in inverted V-form. The inner edge of the section 360 rests upon the upper edge of the rear turret-wall 80. In this movement, the weight of the cover-sections is counterbalanced by a tension-spring 384 joining a short arm 386 extending from the lever near its fulcrum to the adjacent wall of the turret. The opening movement continues until a stop-pin 387 set in the lever comes in contact with the bracket 377. The pivotal connection between the lever and the link has now passed the position in which these elements are alined, and the spring 384 acts to hold the pin against the projection, with the cover-sections yieldably held in their raised relation. As this opening movement of the cover-sections is progressing, each hood-section 368, when closed, is held against angular, inward movement by engagement of its outer side wall with the edges 383 of the cover-projections 373.

The sight S is directed through a variable opening 390 occupying the central portion of the wall 86 of the turret (Fig. 1), the extent of this opening being such as to allow the full movement of the sight in elevation as it swings with the gun-carrying plates 100. During fire, it may be more or less open to protect the gunner as far as possible without interference with the sight, it being closed under the control of said sight. The sides of the opening 390 are furnished by filler-strips 392, 392 attached to the walls 86. These strips may be changed to alter the width of the opening. In the opposed inner edges of the strips are formed ways 394, 394 (Figs. 26 and 27), which receive the outer edges of a lower slide 396 and of an upper slide 398 movable upon the lower. To the upper extremity of the upper slide is pivoted a link-section 400 of the cover, which at its top is pivoted to a terminal-section 402 resting at its opposite edges, when the slides are fully lowered, upon projections 404 from depending portions of the strips 392. From the upper portion of the opposite sides of the section 402 are projections 406, 406, lying in ways 408, 408 in the opposite forward portions of the sight S. When the sight is elevated under the power of the motor 122, the bottoms of the ways at 409 strike the projections 406. These first turn the terminal-section 402 into approximate alinement with the link-section 400, and then, as upward movement of the sight continues, draws the slide 398 over the slide 396. The wall-opening 390 is consequently closed proportionately to the sight-movement. When the lower end of the slide 398 reaches the top of the slide 396, projections 410, 410 from its opposite lower corners strike shoulders 412, 412 on the opposite upper corners of the slide 396. Upon continued upward movement of the sight, the four cover-portions travel together, until their closing action is completed when the sight has attained its upper limit. Upon downward movement of the sight, the ends 409 of the ways upon the sight leave the terminal-projections 406, and the cover-portions are returned by gravity to their initial positions. The travel of the section 396 in this direction is limited by ts contact with a stop-projection 414 rising from the wall 86. The other sections of the closure are retained by the engagement of the projections 406 with the sight-ways 408.

The chair disclosed herein is not claimed herein since it is claimed in my copending application Serial No. 670,927, filed May 20, 1946, now Patent No. 2,453,208, granted November 9, 1948, as a division of the present application.

The gun mounting disclosed herein is not claimed herein since it is claimed in my copending application Serial No. 670,928, filed May 20, 1946, now abandoned, as a division of the present application.

Having described my invention, what I claim as new and desire to secure by Letters Patent of the United States is:

1. The combination with a base, of a table rotatable on the base, a turret-body having walls rising from the table, each of opposite side walls of the turret being provided with an opening, a gun-carrying plate covering each opening, a spindle projecting inwardly from each plate, a standard rising from the table within each side wall and furnishing a bearing for the corresponding spindle, a gear fast upon each spindle, a shaft rotatable upon the table, two arms fixed to the shaft, a rack pivoted to each arm and meshing with one of the gears, means for variably pressing the racks into mesh with said gears, a third arm fixed to the shaft, and a motor-cylinder carried upon the table and having a piston joined to the third arm.

2. The combination with a movable turret, of a gun mounted upon the turret, motors by which the turret is moved in azimuth and the gun in elevation to direct the fire of the gun, valve mechanism by which the two movements of the turret and the gun are governed, gunner's grip mechanism situated in the turret and having a member movable in azimuth and elevation to correspondingly control the valve mechanism, a projection from the grip member sharing in the movements of said member, a device mounted to rock about axes at right angles to each other and engaging the grip-projection, a rod rotatable and movable longitudinally by a second man in the turret, and means for communicating the two movements of the rod to move the rocking device about its two axes and thereby move the gunner's grip mechanism.

3. The combination with a movable turret, of a gun mounted upon the turret, motors by which the turret is moved in azimuth and the gun in elevation to direct the fire of the gun, valve mechanism by which the two movements of the turret and the gun are governed, gunner's grip mechanism situated in the turret and having a body-portion movable in azimuth and elevation to correspondingly control the valve mechanism, and an arm projecting from the body-portion and provided with a socket, a pivoted yoke, a casing trunnioned upon the yoke, a plunger movable in the casing into and out of engagement with a socket, a rod rotatable and movable longitudinally by a second man in the turret, means for communicating the rotation of the rod to the yoke to turn it about its pivot, and means for communicating with longitudinal movement of the rod to the casing to turn it upon the yoke.

4. The combination with a movable turret, of a gun mounted upon the turret, motors by which the turret is moved in azimuth and the gun in elevation to direct the fire of the gun, valve mechanism by which the two movements of the turret and the gun are governed, gunner's grip mechanism situated in the turret and having a member movable in azimuth and elevation to correspondingly control the valve mechanism, a projection from the grip member sharing in the movements of said member, a device mounted to rock about axes at right angles to each other and engaging the grip-projection, a grip member movable by a second man in the turret, and means for connecting the second man's grip member to the rocking device to move it about its two axes and thereby move the gunner's grip mechanism.

5. The combination with a movable turret, of a gun mounted upon the turret, motors by which the turret is moved in azimuth and the gun in elevation to direct the fire of the gun, valve mechanism by which the two movements of the turret and the gun are governed, gunner's grip mechanism situated in the turret and having a member movable in azimuth and elevation to correspondingly control the valve mechanism, a projection from the grip member sharing in the movements of said member, a device mounted to rock about axes at right angles to each other and having a portion movable into and out of engagement with the grip-projection, a grip member movable by a second man in the turret, and means for connecting the second man's grip member to the rocking device to move it about its two axes and thereby move the gunner's grip mechanism.

6. The combination with a movable turret, of a gun mounted upon the turret, motors by which the turret is moved in azimuth and the gun in elevation to direct the fire of the gun, valve mechanism by which the two movements of the turret and the gun are governed, gunner's grip mechanism situated in the turret and having a body-portion movable in azimuth and elevation to correspondingly control the valve mechanism, a bracket mounted adjacent to the gunner's grip mechanism, a sleeve rotatable in the bracket, a rod splined in the sleeve for longitudinal movement therethrough, a second man's grip member upon the rear extremity of the rod, means for transmitting the rotation of the sleeve to move the gunner's grip member in azimuth, and means for transmitting the longitudinal movement of the rod to move the gunner's grip member in elevation.

7. The combination with a turret, of a gun movable thereon, a motor by which the gun is moved, a gunner's chair in the turret, mechanism situated in front of the gunner's chair for governing the motor and including a body-portion and gunner's hand-holds pivoted thereon for movement from operative position to inoperative position, means for yieldably retaining the hand-holds in their inoperative position away from the gunner's chair, and spring-actuated latches for locking the hand-holds in their operative, motor-governing position.

RENÉ E. DUPLESSIS.

REFERENCES CITED

The following references are of record in the file of this patent:

UNITED STATES PATENTS

| Number | Name | Date |
|---|---|---|
| 1,063,317 | Bartels | June 3, 1913 |
| 1,107,477 | Bartels | Aug. 18, 1914 |
| 1,826,603 | Dayton | Oct. 6, 1931 |
| 1,861,938 | Roche | June 7, 1932 |
| 2,016,292 | Rarey | Oct. 8, 1935 |
| 2,029,692 | Zindel | Feb. 4, 1936 |
| 2,282,742 | Poysa | May 12, 1942 |
| 2,291,247 | McArthur | July 28, 1942 |
| 2,292,414 | Vernon | Aug. 11, 1942 |
| 2,335,835 | Zietlow | Nov. 30, 1943 |
| 2,347,406 | Frazer-Nash | Apr. 25, 1944 |
| 2,363,356 | Pflager | Nov. 21, 1944 |
| 2,364,425 | Corte | Dec. 5, 1944 |
| 2,371,324 | Trotter | Mar. 13, 1945 |
| 2,373,127 | Lord | Apr. 10, 1945 |
| 2,373,990 | Barnhart | Apr. 17, 1945 |
| 2,378,050 | Vaughan | June 12, 1945 |
| 2,388,010 | Pohl | Oct. 30, 1945 |

FOREIGN PATENTS

| Number | Country | Date |
|---|---|---|
| 422,009 | Great Britain | Jan. 3, 1935 |
| 424,002 | Great Britain | Feb. 11, 1935 |
| 436,071 | Great Britain | June 4, 1935 |
| 483,847 | Great Britain | Feb. 15, 1937 |
| 489,208 | Great Britain | July 21, 1938 |
| 673,342 | France | Oct. 7, 1929 |
| 775,549 | France | Oct. 15, 1934 |

OTHER REFERENCES

"Flight" Magazine, February 4, 1943, pages 122–127.